C. DAVIS.
APPARATUS FOR FIRING PROJECTILES FROM AIR CRAFT.
APPLICATION FILED JULY 7, 1913.
1,108,716.
Patented Aug. 25, 1914.
5 SHEETS—SHEET 1.
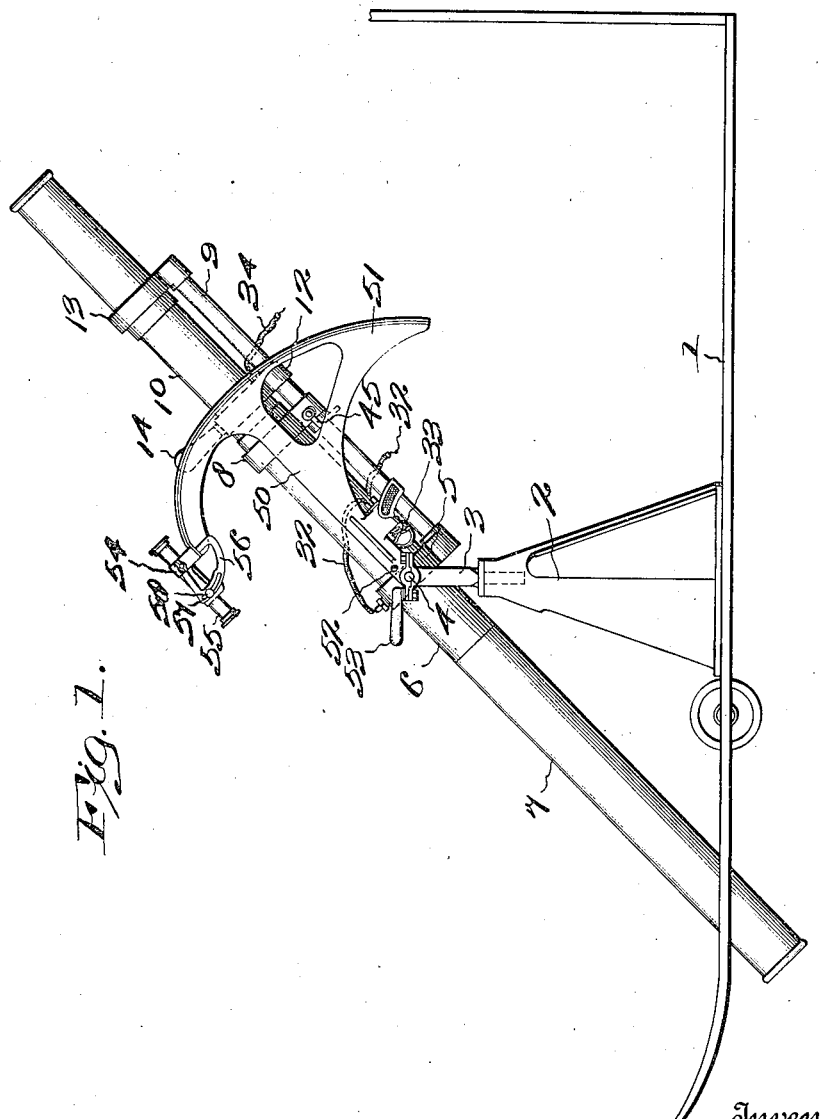

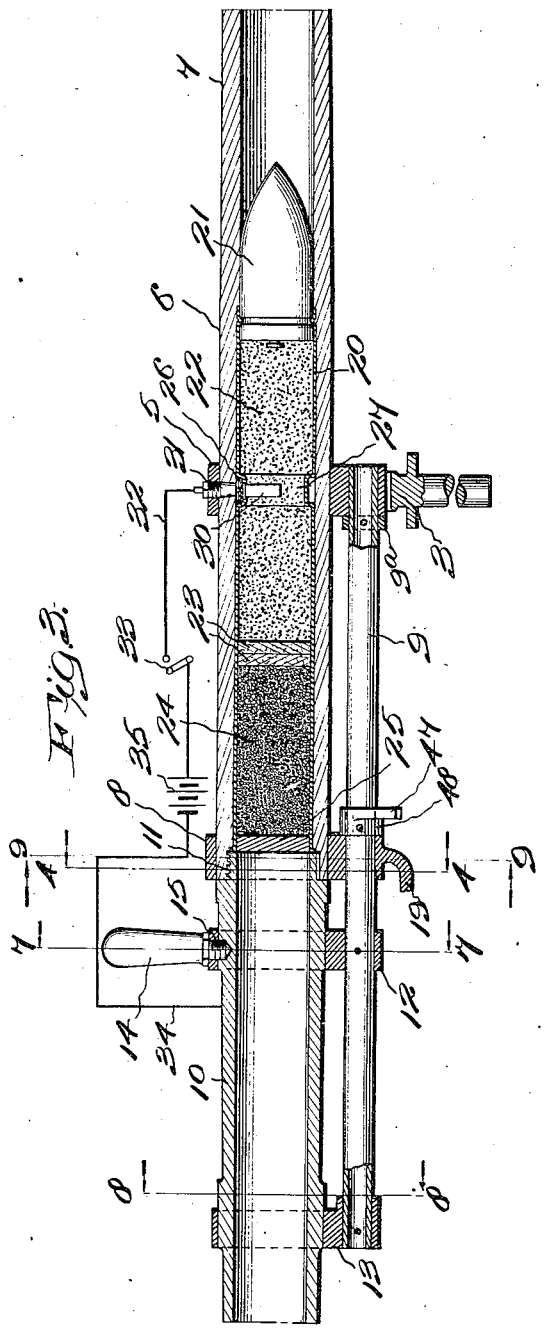

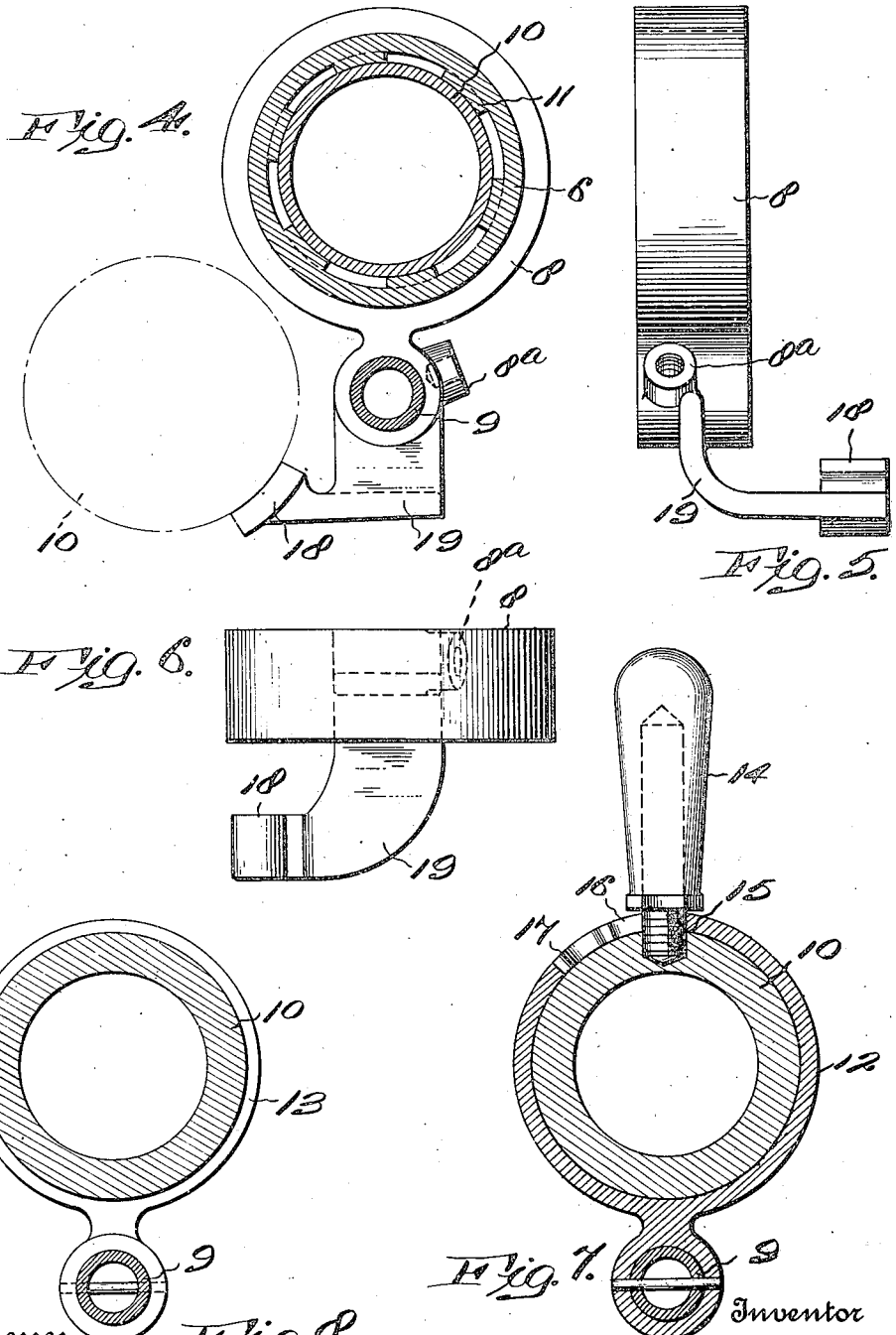

C. DAVIS.
APPARATUS FOR FIRING PROJECTILES FROM AIR CRAFT.
APPLICATION FILED JULY 7, 1913.
1,108,716.  Patented Aug. 25, 1914.
5 SHEETS—SHEET 4.
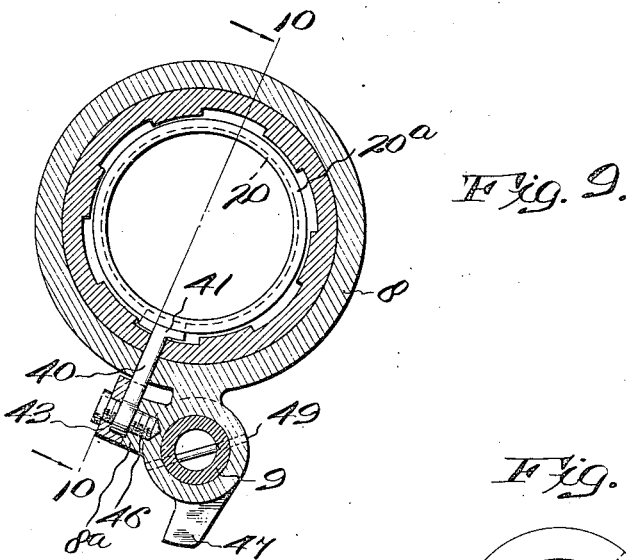
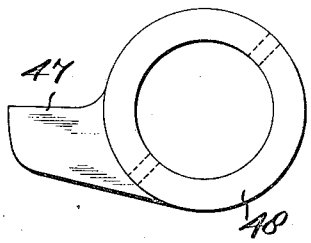
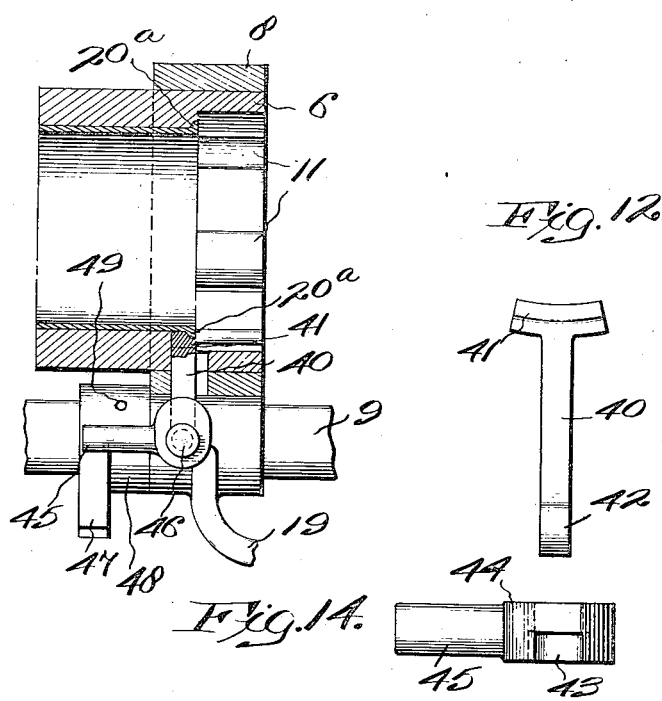
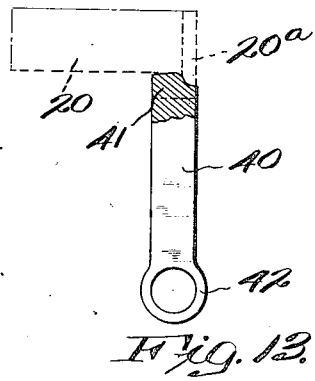
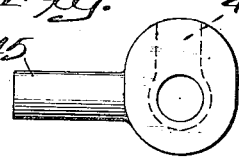

C. DAVIS.
APPARATUS FOR FIRING PROJECTILES FROM AIR CRAFT.
APPLICATION FILED JULY 7, 1913.
1,108,716.
Patented Aug. 25, 1914.
5 SHEETS—SHEET 5
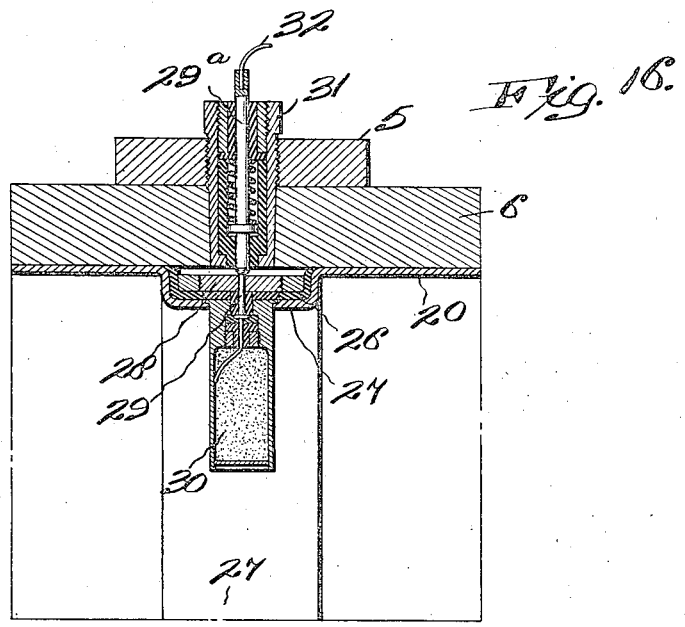
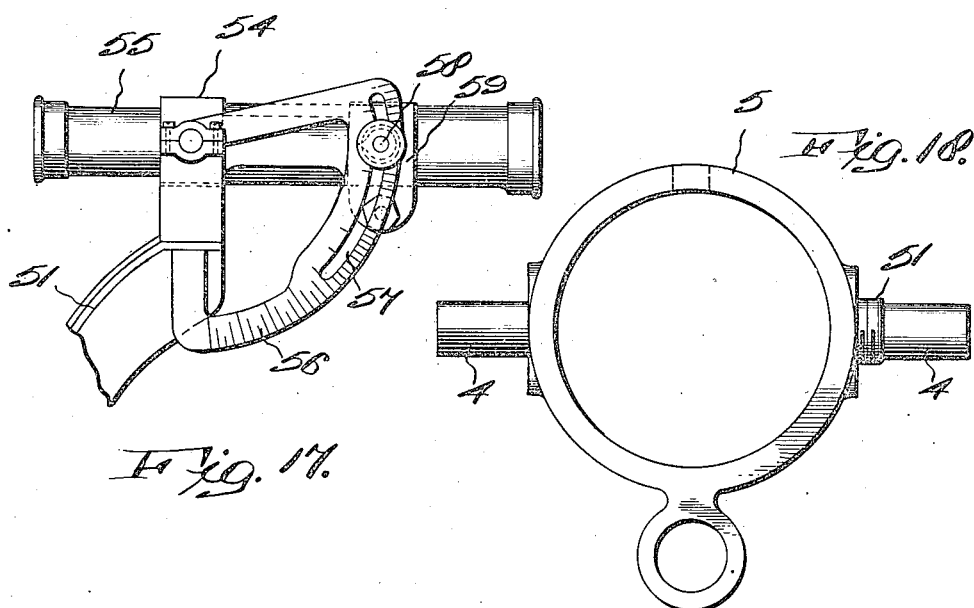

UNITED STATES PATENT OFFICE.

CLELAND DAVIS, OF THE UNITED STATES NAVY, ASSIGNOR TO ORDNANCE DEVELOPMENT COMPANY, A CORPORATION OF DELAWARE.

APPARATUS FOR FIRING PROJECTILES FROM AIR-CRAFT.

1,108,716.   Specification of Letters Patent.   Patented Aug. 25, 1914.

Application filed July 7, 1913. Serial No. 777,763.

*To all whom it may concern:*

Be it known that I, CLELAND DAVIS, commander, United States Navy, a citizen of the United States, residing at Washington, in the District of Columbia, have invented certain new and useful Improvements in Apparatus for Firing Projectiles from Air-Craft; and I do hereby declare the following to be a full, clear, and exact description of the invention, such as will enable others skilled in the art to which it appertains to make and use the same.

My invention relates to improvements in an apparatus for firing projectiles from air craft, and the object of the invention is to provide an apparatus which will be sufficiently light to be carried, with one or more projectiles and propelling charges, by the air craft; to be readily and quickly loaded and re-loaded; and to be quickly and conveniently clamped in any desired position, and more especially to provide a gun which may be fired with as little recoil as possible so as not to upset the balance of, or to put undue strains upon the air craft.

According to the present invention, the gun, and firing means, is so arranged that a compensating mass whose inertia is preferably substantially the same as that of the projectile flies through the open breech of the gun in the opposite direction to the projectile. By this means the shock of the recoil is neutralized and no undue strain is imposed upon the air craft.

A still further object is to provide suitable ammunition for the gun, and so arrange the gun that the loading apparatus may be reduced to a very simple form, which may be readily and conveniently operated on board the air craft, and which is not likely to get out of order.

This invention is intended especially to provide improvements in the apparatus shown in my pending U. S. application filed August 22, 1911, Serial No. 645365, entitled Aeroplane gun, and my U. S. application filed November 21, 1911, Serial No. 661566, entitled Apparatus for firing projectiles from aeroplanes.

My invention will be understood by reference to the accompanying drawings in which:—

Figure 1 shows the gun mounted on the aeroplane, parts only of the aeroplane being shown; Fig. 2 is a plan view of the gun as detached from its mount; Fig. 3 shows a section along the line 3—3 of Fig. 2, and looking in the direction of the arrows; Fig. 4 shows a section along the line 4—4 of Fig. 3, and looking in the direction of the arrows; Fig. 5 is a side elevation of those parts of the apparatus shown in Fig. 4 as seen from the right thereof; Fig. 6 is a plan view of the parts shown in Figs. 4 and 5; Fig. 7 shows a section along the line 7—7 of Fig. 3, and looking in the direction of the arrows; Fig. 8 shows a section along the line 8—8 of Fig. 3, and looking in the direction of the arrows; Fig. 9 shows a section along the line 9—9 of Fig. 3, and looking in the direction of the arrows; Fig. 10 shows a section along the line 10—10 of Fig. 9, and looking in the direction of the arrows; Fig. 11 is a detail view showing the extractor cam; Fig. 12 is a detail showing the front view of the extractor; Fig. 13 shows a side elevation of the extractor, parts being broken away; Figs. 14 and 15 show side and plan views, respectively, of the extractor lever; Fig. 16 is a section showing the firing device; Fig. 17 is a side elevation of the telescopic sight carried by the pointing arm; and Fig. 18 is a detail showing the trunnion band and trunnions.

The gun is mounted upon a suitable mount, such as the pedestal 2, attached to any suitable part 1, of the framework of the aeroplane, dirigible, or other air craft, for carrying the gun. This pedestal 2 carries the yoke 3 swiveled therein, which supports the trunnions 4 of the trunnion band 5 of the gun.

The gun barrel is shown composed of two parts, the forward part 6 being practically the same as in any ordinary gun barrel, which may be tapered toward the muzzle 7. In order to secure the requisite lightness the gun barrel should preferably be made of the highest quality of steel, such, for instance, as vanadium steel, heat treated, where the tensile strength and elastic limit are several times as great as in ordinary steel. The pedestal and other portions of the mount, except the gun barrel proper, should be made of very light material, such as aluminum alloys.

Mounted on the barrel portion of the gun barrel are the trunnion band 5 and the band 8 surrounding the screw box. Both of these bands are provided with downwardly-projecting hollow lugs adapted to form journal bearings for the supporting spindle 9, which is held against longitudinal movement in said bearings as by the pin 9ª and the collar 48. This spindle is preferably made of steel tubing for the sake of lightness.

The rear portion of the gun barrel 10, when in the firing position, is locked to the forward portion 6 by means of interrupted screw threads 11, as shown most clearly in Figs. 3 and 4. This rear portion of the barrel, corresponding to the breech lock of an ordinary gun, is open rearward, and is loosely mounted in the operating band 12 and the rear band 13; and these two bands 12 and 13 are rigidly connected to the spindle 9. The band 12 is provided with a curved cam groove adapted to receive the reduced portion of the operating handle 14, which is secured to the part 10 of the gun, as by means of the screw threads 15. This curved cam groove is arranged so that its part 16 will permit the slight turning and rearward movement of the operating handle for unlocking the interrupted screw threads, and the part 17 will permit a slight rearward motion of the breech end of the gun barrel, permitting the screw threads 11 to become disengaged, and the rear part 10 of the gun barrel to be moved far enough to the rear to have these screw threads clear the screw box. Now, if the handle is let go, or is given a twisting movement, the rear part of the gun barrel will swing downward either by gravity alone, or with the assistance of the power applied to the handle, to the position shown in dotted lines in Fig. 4, thus unmasking the breech of the gun and permitting the insertion of the cartridge case from the rear.

In order to limit the downward swing of the rear portion of the barrel a suitable stop, such as 18, see Figs. 4, 5 and 6, is provided, which is carried by an arm 19 attached to the band 8.

It will be seen that a short and continuous movement of the handle will disengage the interrupted screw threads, will move the rear portion of the gun barrel to the rear, and will then cause this portion of the gun barrel and the parts moving therewith to rock the spindle 9 to a sufficient angle to unmask the breech of the forward portion of the barrel. To close the breech, reverse the operation.

For use with this gun, I have designed a special form of fixed ammunition, which will now be described.

20, see Fig. 3, shows an elongated cartridge case having its forward end crimped into the projectile 21, which projectile may be of the ordinary, or any preferred type. In the rear of the projectile is the propelling charge of powder 22, and in rear of this are one or more wads 23, preferably of felt, or some other material, in rear of which is the compensating recoil weight 24 which may be of fine bird-shot, sand, or other suitable material, which will break up into small fragments when expelled to the rear, thus preventing injury to persons below other than those aimed at. It will be obvious that a projectile might be carried in the rear of the wads 23 to be fired in the rearward direction, and at the same time that the forward projectile is fired through the muzzle of the gun. In ordinary practice, it would be preferable to have the compensating recoil weight made of suitable disintegratable material. In rear of this compensating weight, I may provide a suitable wad 25, preferably of felt, which forms a closure for the rear end of the cartridge case. If desired, a friable end may be used in the cartridge case adapted to blow out under low pressure when the gun is fired; but I prefer to use a cartridge case that is open at its rear, not only to avoid any unbalanced shock, but also to enable the cartridge case to be conveniently reloaded when desired, with the low pressures of this type of gun there would be very little permanent set in expansion of the cartridge case, and the same may be used over and over again without sticking in the bore.

In order to ignite the propelling charge, I have designed a novel form of electric firing apparatus, shown in Figs. 1, 3 and 16, and in which 26, see Fig. 16, represents an insulating collar mounted in the groove 27 stamped in the rear of the cartridge case, and inclosed in this insulating collar, but countersunk below the periphery of the cartridge case, is a metallic ring 28 carrying the conducting piece 29 of the primer 30. When the cartridge case is shoved home to the firing position, this conducting ring 28 will register with the spring plunger 29ª, or firing pin, of the firing plug 31, and this plunger is connected in the well known way by the conductor 32 and switch 33 to one pole of the source of electricity indicated at 35 in Fig. 3, while the other pole is connected by the conductor 34 to any portion of the gun body, so that when the switch 33 is closed the current will pass through the primer and explode same, igniting the propelling charge in the cartridge case, irrespective of the position of the firing pin 29ª relative to the primer. I have arranged that the switch 33 shall be operated by the trigger of the gun, as shown in Fig. 1. Of course, there should be an electric cut out to break the circuit when the breech of the gun is open. Any of the well known electrical devices used for this purpose may be adopted, if desired.

In order to remove, or at least start the empty cartridge case after the gun has been fired, I provide the extractor mechanism shown in detail in Figs. 9 to 15, in which 40 represents the extractor having the usual claw 41 adapted to engage the rim 20ª of the cartridge case 20. This extractor has a perforated heel 42 adapted to engage in the socket 43 of the extractor lever 44, and this extractor lever and the extractor are both pivotally connected to the socket 8ª, carried by the band 8, by means of the bolt 46. The arm 45 of the extractor lever projects in the path of movement of the cam arm 47 of the extractor cam 48, which cam is secured to and rocks with the shaft 9. When the breech of the gun is open, the rear portion of the barrel, and the moving parts carried thereby, swing about the axis of the spindle 9, and the arm 47 of the extractor cam is caused to strike the arm 45 of the extractor lever with a sharp blow, as well as a camming action, and causes the extractor to start the cartridge case rearward. If it is not totally ejected by the extractor action, it will be moved far enough to the rear to be readily pulled out by hand. A sharp swinging action of the handle would, of course, supplement the inertia of the moving parts and thus sufficient extraction will be secured. For reasons already explained, there will be little tendency of the cartridge case to stick in the bore, and no great power would be needed in extracting, or starting the same.

In order to point the gun I have provided the pointing arm 50 secured to the trunnion band 5 in any convenient way as by means of the screw threads 51 and the bolt 52, so that this pointing arm rocks the gun body about its trunnions. At the rear end of the pointing arm I provide a curved shoulder piece which is so arranged that the gun pointer may use the same in moving the gun through a wide angle about its trunnions. If it is desired to fire the gun in the vertical, or nearly vertical, direction, this pointing arm may be adjustably connected to the gun body in any convenient way.

In order to get the proper angle between the line of fire and the line of sight, I provide the telescopic sighting arrangement carried by the pointing arm, and shown in Figs. 1, 2 and 17. This sighting arrangement comprises a suitable yoke 54 to carry the telescope trunnions, the telescope 55 mounted on said trunnions, and the graduated arm 56 slotted at 57 to receive the clamping screw 58 of the telescope holder 59. This telescope may be thus adjusted at any desired elevation, or rather depression, since the gun would ordinarily be fired at an angle of depression.

When not in use, the gun may be clamped in the desired position by means of the clamp lever 53.

In the herein described construction, I do not mean to limit the invention to any particular means of mounting the gun on the air craft, as this means would be varied according to the nature of the craft itself, whether for aeroplanes, hydroplanes, dirigibles, or the like.

While I have suggested that the counter mass should be of substantially the same weight as to the projectile, so that the resultant inertia should be practically neutralized, thus limiting the shock on the gun platform, there, nevertheless, may be material differences in the weight of the projectile and the counter weight within which the gun would function properly.

While I have shown the gun barrel with a smooth bore, and that would be the preferable construction because lighter barrels could be used than if the barrel were rifled, still the gun may be rifled if desired; in which case it would preferably have the rear portion of the barrel also rifled, with similar rifling rearward of the powder chamber to that forward of the same, and a counter weight should preferably be used adapted to take a rifling band, so that the twisting effect of the rifling on the gun mount might be neutralized. The twisting of the two projectiles in opposite directions would cause two equal and opposite forces to neutralize any rotary movement of the gun about its axis. With a very light gun on a very light platform, this rotary force if unbalanced might result in accidents, which would not be likely to occur with an ordinary gun on an ordinary mount. It will be noted that this mount and the gun platform are not affected by the shock of recoil, and they need only be of sufficient strength to support the weights carried.

It will be obvious that various other modifications might be made in the herein described apparatus, and in the construction, combination and arrangement of parts which could be used without departing from the spirit of my invention.

Having thus described my invention what I claim and desire to secure by Letters Patent of the United States is:—

1. A gun having a barrel of light, high-grade material made up of two interlocking sections, both sections having the bore continuous therethrough, with means for locking said sections together and unlocking the same, and means for swinging the rear section clear of the front section, substantially as described.

2. A gun having its barrel composed of two members with the bore open through each, with means for detachably connecting said members together, and means for swinging the breech member laterally away from the forward member of the gun when the two members are disengaged and for returning the same to the initial locked position, substantially as described.

3. A gun having its barrel composed of two members, with the bore open through each, with means for detachably connecting said members together, and means for swinging the breech member laterally away from the forward member of the gun when the two members are disengaged and for returning the same to the initial locked position, said means comprising a spindle journaled on the forward member parallel to the axis thereof, bands secured to said spindle and loosely mounted on the breech member, a slotted screw engagement between the two members, and means for rotating the breech member in its bands, drawing the same to the rear, and swinging same about its spindle, substantially as described.

4. A gun having its barrel composed of two members with the bore open through each, with means for detachably connecting said members together, and means for swinging the breech member laterally away from the forward member of the gun when the two members are disengaged and for returning the same to the initial locked position, said means comprising a spindle journaled on the forward member parallel to the axis thereof, bands secured to said spindle and loosely mounted on the breech member, a slotted screw engagement between the two members, and means for rotating the breech member in its bands, drawing the same to the rear, and swinging same about its spindle, said means comprising a handle attached to the breech member, and a cam groove provided in one of said bands and engaging said handle, substantially as described.

5. A gun having its barrel composed of two members with the bore open through each, with means for detachably connecting said members together, and means for swinging the breech member laterally away from the forward member of the gun when the two members are disengaged and for returning the same to the initial locked position, with a stop carried by the forward portion to limit the swing of the rear portion about the axis of said spindle, substantially as described.

6. A gun having its barrel composed of two members with the bore open through each, with means for detachably connecting said members together, and means for swinging the breech member laterally away from the forward member of the gun when the two members are disengaged and for returning the same to the initial locked position, said means comprising a spindle journaled on the forward member parallel to the axis thereof, bands secured to said spindle and loosely mounted on the breech member, a slotted screw engagement between the two members, and means for rotating the breech member in its bands, drawing the same to the rear, and swinging same about its spindle, with a stop carried by the forward portion to limit the swing of the rear portion about the axis of said spindle, substantially as described.

7. A gun having its barrel composed of two members with the bore open through each, with means for detachably connecting said members together, and means for swinging the breech member laterally away from the forward member of the gun when the two members are disengaged and for returning the same to the initial locked position, said means comprising a spindle journaled on the forward member parallel to the axis thereof, bands secured to said spindle and loosely mounted on the breech member, a slotted screw engagement between the two members, and means for rotating the breech member in its bands, drawing the same to the rear, and swinging same about its spindle, said means comprising a handle attached to the breech member, and a cam groove provided in one of said bands and engaging said handle, with a stop carried by the forward portion to limit the swing of the rear portion about the axis of said spindle, substantially as described.

8. A gun having a barrel of light, high-grade material made up of two interlocking sections, both sections having the bore continuous therethrough, with means for locking said sections together and unlocking the same, and means for swinging the rear section clear of the front section, with a cartridge case extractor pivoted on the forward section of the gun, with means operated by the movement of the rear section of the gun for operating said extractor, substantially as described.

9. A gun having its barrel composed of two members with the bore open through each, with means for detachably connecting said members together, and means for swinging the breech member laterally away from the forward member of the gun when the two members are disengaged and for returning the same to the initial locked position, with a cartridge case extractor mounted on the forward member, with means operated by the movement of the breech member for operating said extractor.

10. A gun having its barrel composed of two members with the bore open through each, with means for detachably connecting said members together, and means for swinging the breech member laterally away from the forward member of the gun when the two members are disengaged and for returning the same to the initial locked position, said means comprising a spindle journaled on the forward member parallel to the axis thereof, bands secured to said spindle and loosely mounted on the breech member, a slotted screw engagement between the two members, and means for rotating the breech member in its bands, drawing the same to the rear, and swinging same about its spindle, with a cartridge case extractor mounted on the forward member, an extractor lever projecting therethrough, and a cam carried by said spindle and adapted to engage said cartridge case lever when said breech member is swung laterally, substantially as described.

11. A gun having its barrel composed of two members with the bore open through each, with means for detachably connecting said members together, and means for swinging the breech member laterally away from the forward member of the gun when the two members are disengaged and for returning the same to the initial locked position, said means comprising a spindle journaled on the forward member parallel to the axis thereof, bands secured to said spindle and loosely mounted on the breech member, a slotted screw engagement between the two members, and means for rotating the breech member in its bands, drawing the same to the rear, and swinging same about its spindle, said means comprising a handle attached to the breech member, and a cam groove provided in one of said rings and engaging said handle, with a cartridge case extractor mounted in the forward member, an extractor lever projecting therethrough, and a cam carried by said spindle and adapted to engage said cartridge case lever when said breech member is swung laterally, substantially as described.

In testimony whereof, I affix my signature, in presence of two witnesses.

CLELAND DAVIS.

Witnesses:
B. H. DAILEY,
R. M. PARKER.